United States Patent

De Vos et al.

[11] Patent Number: 5,484,818
[45] Date of Patent: Jan. 16, 1996

[54] ORGANIC AEROGELS

[75] Inventors: Rik De Vos, Rotselaar; Guy L. J. G. Biesmans, Everberg, both of Belgium

[73] Assignee: Imperial Chemical Industries PLC, United Kingdom

[21] Appl. No.: 279,364

[22] Filed: Jul. 22, 1994

Related U.S. Application Data

[63] Continuation-in-part of Ser. No. 129,297, Sep. 29, 1993, abandoned.

[30] Foreign Application Priority Data

Jul. 22, 1993 [GB] United Kingdom .................. 9315198
Sep. 21, 1993 [GB] United Kingdom .................. 9319451

[51] Int. Cl.⁶ ........................................... C08G 18/00
[52] U.S. Cl. .................... 521/123; 521/124; 521/125; 521/128; 521/129; 521/131; 521/132; 521/155; 521/160; 521/161
[58] Field of Search ...................... 521/123, 124, 521/125, 128, 129, 131, 132, 155, 160, 161

[56] References Cited

U.S. PATENT DOCUMENTS

| | | | |
|---|---|---|---|
| 3,165,483 | 1/1965 | Gemeinhardt et al. | 521/112 |
| 3,574,150 | 5/1969 | Jefferson et al. | 521/63 |
| 3,582,396 | 6/1971 | Konig et al. | 117/135.5 |
| 4,610,863 | 9/1986 | Tewari et al. | 423/338 |
| 4,873,218 | 10/1989 | Pekala | 502/418 |
| 4,997,804 | 3/1991 | Pekala | 502/418 |
| 5,053,274 | 10/1991 | Jonas | 428/332 |
| 5,081,163 | 1/1992 | Pekala | 521/187 |
| 5,086,085 | 2/1992 | Pekala | 521/187 |
| 5,128,382 | 7/1992 | Elliott, Jr. et al. | 521/178 |
| 5,275,796 | 1/1994 | Tillotson et al. | 252/315.01 |

FOREIGN PATENT DOCUMENTS 1172255  11/1969  United Kingdom .

Primary Examiner—Shelley A. Dodson
Attorney, Agent, or Firm—Michael R. Nagy

[57] ABSTRACT

Polyisocyanate based organic aerogels having pore sizes less than 100 nm, densities in the range 10 to 800 kg/m³ and surface areas in the range 10 to 1500 m²/g are provided.

18 Claims, 4 Drawing Sheets

ORGANIC AEROGELS

CROSS-REFERENCE TO RELATED APPLICATIONS

The present application is a continuation-in-part of U.S. patent application Ser. No. 08/129,297, filed Sep. 29, 1993 entitled "Organic Aerogels" now abandoned.

The present invention relates to organic aerogels and more specifically to polyisocyanate based aerogels and to methods for their preparation.

Polyisocyanate based rigid foams such as polyurethane and polyisocyanurate foams are well known in the art and are used as a thermal insulation medium as for example in the construction of refrigerated storage devices. These foams are in general prepared by reacting the appropriate polyisocyanate and polyol in the presence of a blowing agent. The thermal insulating properties of rigid foams are dependent upon a number of factors including, for closed cell rigid foams, the cell size and the thermal conductivity of the contents of the cells (i.e. of the blowing agents used in the preparation of the foams).

A class of materials which has been widely used as blowing agent in the production of rigid polyurethane and polyisocyanurate foams is the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. Recent concern over the potential of chlorofluorocarbons to cause depletion of ozone in the atmosphere has led to an urgent need to develop systems in which chlorofluorocarbon blowing agents are replaced by alternative materials which are environmentally acceptable and which also produce foams having the necessary properties for the many applications in which they are used.

Such alternative blowing agents proposed in the prior art include hydrochlorofluorocarbons, hydrofluorocarbons and (cyclo) alkanes. Although these materials are environmentally more acceptable than chlorofluorocarbons (their ozone depletion potential (ODP) being less or even zero) they are inferior in thermal insulation.

In view of strong demands on energy consumption and environmental legislation alternative polyisocyanate based insulation materials are being investigated.

Evacuated insulation panels filled with open-celled rigid polyurethane foam is one of these options. The use of vacuum will eliminate the gas conductivity from the samples thus reducing the thermal conductivity of the sample.

However the thermal conductivity of such an evacuated insulation panel rapidly increases with internal pressure increase with lapse of time owing to i.a. gases such as air and water vapor diffusing gradually inside the panel.

Aerogels are known for their super insulation properties which are due to the elimination of any contribution from the gas phase. These materials are environmental friendly since they are air filled. Moreover they are not subject to ageing.

Aerogels are a unique class of ultrafine cell size, low density, open-celled foams. Aerogels have continuous porosity and their microstructure with pore sizes below the free mean path of air (pore sizes in the nanometer range) is responsible for their unusual thermal properties.

Traditional aerogels are inorganic (for example, silica, alumina or zirconia aerogels) made via the hydrolysis and condensation of metal alkoxides.

Silica aerogels have been developed as superinsulating material, for example, for double pane windows. Organic aerogels would be expected to have an even lower thermal conductivity and, thus, provide less heat loss in insulating applications.

Recently, organic aerogels have been developed. U.S. Pat. Nos. 4,997,804 and 4,873,218 describe resorcinol-formaldehyde aerogels. U.S. Pat. Nos. 5,086,085 and 5,081,163 describe melamine-formaldehyde aerogels.

Organic aerogels based on polyisocyanate chemistry have not been described hereto before.

Therefore it is an object of the present invention to provide organic aerogels based on the polyisocyanate chemistry and methods for their preparation.

Accordingly, the present invention provides a polyisocyanate based organic aerogel.

The term "polyisocyanate based" as used herein means that the aerogel of the present invention can be of the following types: polyurethane aerogels, polyurea aerogels, polyisocyanurate aerogels, polyisocyanurate/polyurethane aerogels, polyallophanate aerogels, polybidentate aerogels, polybiuret aerogels.

The aerogel according to the present invention has pore sizes less than or equal to 100 nm. Generally the pore sizes are in the range 1 to 100 nm, more generally in the range 5 to 50 nm and even more generally in the range 5 to 25 nm.

Pore sizes can be determined visually by transmission electron microscopy (TEM) or by Brunauer-Emmet-Teller nitrogen adsorption (BET) or Mercury porosimetry. The pore size values quoted are average pore diameters as determined by the Micromeritics ASAP2000 version 3.0 Porosimetry System based on liquid nitrogen adsorption. The average pore diameter is calculated as 4V/A with V=cumulative pore volume per gram of material and A=specific surface area as determined by 5-point BET.

The density of the aerogel of the present invention is generally in the range 1 to 1000 kg/m3, more generally in the range 10 to 800 kg/m$^3$ and even more generally in the range 20 to 400 kg/m$^3$ or even 30 to 300 kg/m$^3$ or even 90 to 200 kg/m$^3$.

Densities can be measured by weighing and determining the displaced volume of water by immersion or by weighing and measuring the geometrical volume of a regularly shaped sample.

The surface area of the aerogel of the present invention is generally in the range 10 to 1500 m$^2$/g, more generally in the range 50 to 1200 m$^2$/g and even more generally in the range 200 to 1000 m$^2$/g or even 700 to 1000 m$^2$/g. Surface areas can be determined, for example, by BET.

The organic polyisocyanate based aerogels of the present invention may be prepared by mixing a polyisocyanate and an isocyanate trimerisation catalyst in a suitable solvent and maintaining said mixture in a quiescent state for a sufficiently long period of time to form a polymeric gel. The gel so formed is then supercritically dried.

The thus obtained aerogels are based on the polyisocyanurate chemistry including urethane-modified polyisocyanurate chemistry.

Alternatively polyisocyanates and higher functionality isocyanate-reactive compounds (such as polyols and polyamines) are dissolved in a suitable solvent to which trimerisation and urethane catalysts are added. The mixture is kept in a quiescent state and thereafter supercritically dried. The thus obtained aerogels are based on the polyurethane and/or polyurea chemistry.

This alternative preparation method allows a larger selection of solvents to be used and enhances the processing window upon gelation time and drying conditions.

Polyisocyanates for use in the present methods for preparing the present aerogels include aliphatic, cycloaliphatic, araliphatic and aromatic polyisocyanates known in the literature for use generally in the production of polyisocyanurate materials. Of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

In case a gaseous solvent is used (such as HCFC 22) the polyisocyanate used in the present method for making the aerogels is preferably a so-called isocyanate-ended prepolymer made from a polyisocyanate and an isocyanate-reactive compound. Preferably the isocyanate-reactive compound for use in the preparation of such a prepolymer is the reaction product of an alkyleneoxide, such as ethyleneoxide and/or propylene oxide with a monol or diol. The ethyleneoxide/propyleneoxide level in such an alkoxylated monol or diol needs to be adjusted to the hydrophilicity of the particular solvent used in the aerogel preparation process, in order for the isocyanate-ended prepolymer to be soluble in this solvent. In case more hydrophobic solvents are used (such as, for example, HCFC 22, HFC 134a, dichlorodifluoromethane, liquid $CO_2$) preference is given to hydrophobic alkoxylated monols or diols having ethyleneoxide/propyleneoxide levels of between 0:100 and 80:20, such as Arlamol-E available from Imperial Chemical Industries PLC. In case hydrophilic solvents are used (such as, for example, acetone, 2-butanone) preference is given to hydrophilic alkoxylated monols or diols having ethyleneoxide/propyleneoxide levels of between 20:80 and 80:20.

In the particular case where hydrofluorocarbons or $CO_2$ are used as solvents the polyisocyanate used in the present method for making the aerogels is preferably a so-called isocyanate-ended prepolymer made from a polyisocyanate and a 'substantially fluorinated isocyanate-reactive compound'.

The term 'substantially fluorinated isocyanate-reactive compound' as used herein is to be understood to refer to any organic compound having at least one isocyanate-reactive functional group in which at least 50% of those hydrogen atoms bonded to carbon atoms in the corresponding unfluorinated compound are replaced by fluorine atoms.

Suitable substantially fluorinated isocyanate-reactive compounds for use in the process of the invention are those of formula (I):

$$[H-Y-(CH_2)_m-(Z')_{q'}]_p-A-(Z)_q-(CH_2)_n-X-H \qquad (I)$$

wherein n is an integer of from 1 or 11;

m is 1 to 11;

p is 0 or 1;

q is 0 or 1;

q' is 0 or 1;

Y is oxygen, sulphur, the group of formula or a group of formula $-SO_2-NR-$, $OR-WR-$, where R is hydrogen, $C_{1-12}$ alkyl, or $C_{1-12}$ fluorinated alkyl;

X is oxygen, sulphur, the group of formula or a group of formula $-SO_2-NR'-$ or $-NR'-$, where R' is $C_{1-12}$ alkyl, $C_{1-12}$ fluorinated alkyl, hydrogen or the group of formula $-(CH_2)_n-(Z)_q-A-[(Z')_{q'}-(CH_2)_m-Y-H]_p$;

Z and Z' each independently are groups of formula or $-SO_2-NR''$ where R'' is hydrogen, $C_{1-2}$ alkyl, $C_{1-12}$ fluorinated alkyl or the group of formula $-(CH_2)_n-A-[(CH_2)_m-Y-H]_p$ or the group of formula $-R'''-Y-H$ where R''' is $C_{1-12}$ alkylene;

and either (i) when p is 0, A is a substantially fluorinated or perfluorinated straight or branched chain alkyl group containing from 2 to 10 carbon atoms;

or (ii) when p is 1, A is a substantially fluorinated or perfluorinated, straight or branched chain alkylene group containing from 2 to 10 carbon atoms.

One group of preferred substantially fluorinated isocyanate-reactive compounds for use in the process of the invention are those of formula (I) as defined above wherein X and Y are both oxygen, and A, Z, Z', n, m, p, q and q' have any of the meanings given above. Preferably p is 0.

Particularly preferred substantially fluorinated isocyanate-reactive compounds for use in the process of the invention are those of formula (II)

$$A-(CH_2)_n-OH \quad (II)$$

wherein A is a substantially fluorinated or perfluorinated, straight or branched chain alkyl group containing from 2 to 10 carbon atoms and n is 1 to 11. Particular mention may be made of those compounds of Formula (II) wherein n is 1 or 2 and A is perfluorinated $C_{3-10}$, straight or branched chain alkyl, such as (perfluoropropyl)methanol, (perfluorobutyl)methanol, (perfluoropentyl)methanol, (perfluorohexyl)methanol, (perfluoroheptyl)methanol, (perfluorooctyl)methanol, (perfluorononyl)methanol, (perfluoroethyl)ethanol, (perfluoropropyl)ethanol, (perfluorobutyl)ethanol, (perfluoropentyl)ethanol, (perfluorohexyl)ethanol, (perfluoroheptyl)ethanol and (perfluorooctyl)ethanol.

Another particular mention may be made of those compounds of formula (II) wherein n is 1 or 2 and A is a substantial fluorinated straight or branched chain alkyl such as 1H, 1H, 7H dodecafluoro 1-heptanol, tetrafluoropropanol, dodecafluoroheptanol, octafluoropentanol, hexadecafluorononanol, 1H,1H-perfluorooctanol, hexafluoropropanol.

Another particularly preferred group of substantially fluorinated isocyanate-reactive compounds for use in the process of the invention are those of formula (III)

$$A-SO_2-N(R'')-(CH_2)_n-OH \quad (III)$$

wherein A is a substantially fluorinated or perfluorinated, straight or branched chain alkyl group containing from 2 to 10 carbon atoms, n is 1 to 11 and R'' is hydrogen or a $C_{1-12}$ alkyl or R'''—OH wherein R''' is $C_{1-12}$ alkylene. Particular mention may be made of those compounds of formula (III) wherein n is 1 or 2 and A is perfluorinated $C_{6-8}$ straight or branched chain alkyl and R'' is hydrogen or $C_{1-4}$ alkyl or R'''—OH wherein R''' is $C_{1-4}$ alkylene such as N-ethyl-N-2-hydroxyethylperfluorooctane sulfonamide, N-methyl-N-2-hydroxyethylperfluorooctane sulfonamide, N-propyl-N-2-hydroxyethylperfluorooctane sulfonamide, N-2-hydroxyethylperfluorooctane sulfonamide, N-ethyl-N-2-hydroxymethylperfluorooctane sulfonamide, N-methyl-N-2-hydroxymethyl-perfluorooctane sulfonamide, N-propyl-N-2-hydroxymethylperfluorooctane sulfonamide, N-2-hydroxymethylperfluorooctane sulfonamide, N-methyl-N-2-hydroxyethylperfluorohexane sulfonamide and bis-N-2-hydroxyethyl-perfluorooctane sulfonamide.

Suitable organic polyisocyanates with which the substantially fluorinated isocyanate-reactive compound(s) may be reacted to form the polyisocyanate composition for use in the process of the invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

The isocyanate ended prepolymers used in the process of the present invention may be conveniently prepared by addition of a particular substantially fluorinated isocyanate-reactive compound to the organic polyisocyanate or by addition of a mixture of several different substantially fluorinated isocyanate-reactive compounds to the organic polyisocyanate, for example under the conditions well known in the art for the preparation of isocyanate-ended prepolymers. Suitably, the addition is performed at an elevated temperature in the range from 50° C. to 100° C. with thorough mixing of the components, and mixing continued at the elevated temperature until substantially all of the isocyanate-reactive compound has reacted with the organic polyisocyanate. Suitably the substantially fluorinated isocyanate-reactive compound(s) is (are) added in an amount in the range from 0.02 to 80% preferably 0.1 to 50% by weight based on the weight of organic polyisocyanate.

In order to improve the stability of the polyisocyanate compositions used in the process of the present invention, it is advantageous to use the allophanate variant of the obtained fluorinated isocyanate-ended prepolymer. This allophanate variant can be prepared by reaction of the obtained fluorinated isocyanate-ended prepolymer with the organic polyisocyanate itself in the presence of a suitable catalyst.

Another method for improving the stability of the polyisocyanate compositions used in the process of the present invention is to use so-called mixed prepolymers obtained by reaction of organic polyisocyanate with a mixture of two or more different substantially fluorinated isocyanate-reactive compounds. Allophanate variants of these mixed prepolymers can also be used. Examples of such preferred mixed prepolymers include prepolymers derived from N-ethyl, N-2-hydroxyethylperfluorooctane sulfonamide and N-methyl-N-2-hydroxyethyl perfluorooctane sulfonamide in ratios varying from 10:1 to 1:10 and preferably from 5:5 to 1:9, prepolymers derived from (perfluorohexyl)(m)ethanol and N-ethyl- or N-methyl-N-2-hydroxyethylperfluorooctane sulfonamide in ratios varying from 10:1 to 1:10, preferably about 1:1.

The polyisocyanate composition for use in the process of the present invention may comprise only one type of said reaction product or may comprise different types of said reaction product derived from different substantially fluorinated isocyanate-reactive compounds and/or different polyisocyanates.

The polyisocyanate for use in the present methods for preparing the present aerogels is used in amounts ranging from 0.5 to 30% by weight, preferably from 2 to 20% by weight and more preferably from 3 to 10% by weight based on the total reaction mixture.

Higher functionality isocyanate-reactive compounds for use in the present preparation methods include reaction products of alkylene oxides, for example ethyleneoxide and/or propyleneoxide, with initiators containing from 2 to 8 active hydrogen atoms per molecule. The obtained reaction products preferably have average hydroxyl numbers of from 300 to 1000, especially from 700 to 1000 mg KOH/g, and hydroxyl functionalities of from 2 to 8, especially from 3 to 6. Suitable initiators include: polyols, for example, water, glycerol, monoethyleneglycol, diethyleneglycol, trimethylolpropane, triethanolamine, pentaerythritol, recorsinol, catechol, sorbitol and sucrose; polyamines, for example ethylene diamine, tolylene diamine, melamine, 1,2,3-triaminobenzene, 1,3,4-triaminobenzene, diethylenetriamine, tetraethylene pentamine, pentaethylene hexamine, diaminodiphenylmethane and polymethylene polyphenylene polyamines; and aminoalcohols, for example ethanolamine, diethanolamine and triethanolamine; and mixtures of such initiators.

Preferred higher functionality isocyanate-reactive compounds for use in the present preparation methods include ethoxylated/propoxylated ethylene diamines.

The polyfunctional isocyanate-reactive compound, when present, is used in amounts ranging from 1 to 60%, preferably from 5 to 30% by weight based on the polyisocyanate amount.

The polyisocyanate and higher functionality isocyanate-reactive compound are reacted at isocyanate indices varying between 100 and 600, preferably at an index of about 400.

Trimerisation catalysts for use in the present preparation methods include any isocyanate trimerisation catalyst known in the art such as quaternary ammonium hydroxides, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present method are Polycat 41 available from Abbott Laboratories, and DABCO TMR, TMR-2 and TMR-4 available from Air Products.

Urethane catalysts for use in the present preparation methods include any of those catalysts known in the art to promote urethane and/or urea reaction. Suitable urethane catalysts include aliphatic and aromatic tertiary amines such as N,N-dimethylcyclohexylamine, organometallic compounds, especially tin compounds such as stannous octoate and dibutyltin dilaurate, alkali metal salts. Preferred urethane catalysts include Catalyst SFC, Catalyst SFB (both available from Imperial Chemical Industries) and Niax A1 (available from Union Carbide).

Mixtures of trimerisation catalysts and urethane catalysts can be used in any combination. The composition of the catalyst package will depend on the desired reaction profile. The weight ratio urethane catalyst/trimerisation catalyst varies between 0 and 2:1.

The polyisocyanate/total catalyst weight ratio varies between 5 and 1000. The preferred polyisocyanate/catalyst weight ratio depends on the amount of polyisocyanate used, the reaction/cure temperature, the solvent used, additives used (such as polyfunctional polyols).

As a matter of (non-exhaustive) example the following rules apply. At polyisocyanate levels of about 20% by weight based on the total reaction mixture the preferred polyisocyanate/catalyst weight ratio is higher than 600 and preferably between 700 and 800; at polyisocyanate levels of about 15% by weight based on the total reaction mixture said ratio is between 400 and 700 and preferably between 500 and 650; at polyisocyanate levels of about 10% by weight based on the total reaction mixture said ratio is between 350 and 550 and preferably between 400 and 500 and at low polyisocyanate levels (about 5% by weight based on the total reaction mixture) said ratio is between 50 and 450 and preferably between 100 and 350. In case prepolymers of polyisocyanate and isocyanate-reactive compounds are used together with gaseous solvents these preferred polyisocyanate/catalyst ratios vary between 100 and 400 for about 20 wt % polyisocyanate, between 50 and 200 for about 15 wt % polyisocyanate and between 10 and 100 (preferably between 30 and 60) for about 10 wt % polyisocyanate.

The solvent to be used in the preparation methods according to the present invention should be a solvent for the monomeric (non-reacted) polyisocyanate as well as for the polymeric (reacted) polyisocyanate. The solvent power should be such as to form a homogeneous solution of non-reacted compounds and to dissolve the reaction product or at least prevent flocculation of the reaction product. Solvents with a δ Hansen solubility parameter between 10 and 35 $MPa^{1/2}$, preferably between 15 and 30 $MPa^{1/2}$, most preferably between 18 and 26 $MPa^{1/2}$ are most suitable. Further the critical pressure and critical temperature of the solvent should be as low as possible so as to simplify the critical drying step.

Suitable solvents for use in the method according to the present invention include hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone and methyl ethyl ketone.

Suitable alkyl alkanoates which may be used as solvent include methyl formate, methyl acetate, ethyl formate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluorothane, 1,2,2-tetrafluoroethane, pentafluorobutane, tetrafluoropropane and pentafluoropropane.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

preferred solvents for use in the method according to the present invention are dichloromethane, methyl ethyl ketone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures.

Another suitable solvent is liquid carbondioxide ($CO_2$). Liquid carbondioxide may be used under various pressures (above 63 bar at 20° C.) and temperatures. Also sub- or supercritical carbondioxide can be used as a solvent. The solvent power of sub- or supercritical carbondioxide can be adjusted by adding suitable modifiers such as methanol, ethanol, acetone, HCFC 22, dichloromethane or any other solvent as mentioned hereinbefore in levels of 0.1 to 50% by volume.

In case liquid carbondioxide is used as solvent it has shown to be an advantage to use as polyisocyanate in the preparation of the present aerogels a fluorinated isocyanate-ended prepolymer made from a polyisocyanate and a fluorinated isocyanate-reactive compound such as a fluorinated monol or diol.

The polyisocyanate, the catalyst(s), the solvent and optionally the higher functionality isocyanate-reactive compound are mixed by simply shaking the reaction vessel or by slowly stirring the mixture. Alternatively the polyisocyanate, the Solvent and optionally the higher functionality isocyanate-reactive compound are first mixed and subsequently the catalyst(s) are added hereto (in any suitable order). Some catalyst may also be added after the gelling for enhancing post-cure. Mixing can be done at room temperature or at somewhat higher temperatures.

In case of low boiling solvents (boiling point below room temperature), for example HCFC 22, the solvent is added under its own vapour pressure or at increased pressures to a pressure vessel containing the polyisocyanate, the catalyst(s) and optionally the higher functionality isocyanate-reactive compound.

Thereafter the mixture is left standing for a certain period of time to form a polymeric gel. This time period varies from 1 minute to several weeks depending on the system and the targeted void size and density. Temperatures in the range of from about 20° C. to about 50° C., preferably 40° to 45° C. may be employed, a temperature of about 10° C. below the boiling point of the solvent used being preferred.

In the case of low boiling solvents such as HCFC 22 the pressure in the closed vessel is maintained at its saturated vapour pressure or at higher pressures and the gelation reaction is carried out at higher temperatures (preferably in the range 30° to 50° C.). At these elevated reaction temperatures DABCO TMR is the preferred trimerisation catalyst.

Although the mixture gels within a few hours, it has been found to be advantageous to cure the gels for a minimum of 24 hours so as to obtain a solid gel that can be easily handled in subsequent processing. A postcure cycle at elevated temperatures can be included.

The small cell sizes of the obtained gels necessitates supercritical drying. Large capillary forces at the liquid-vapor interface cause the gel to shrink or crack if the solvent is removed by evaporation. In the case of supercritical drying no surface tension is exerted across the pores, and the dry aerogel retains the original morphology of the gel.

Supercritical drying of the obtained aerogels of the present invention involves placing the solvent-filled gel in a temperature-controlled pressure vessel and bringing the vessel to a pressure above the critical pressure of the solvent (for example by filling with nitrogen gas). At that point the vessel is then heated above the critical temperature of the solvent. After a few hours the pressure is slowly released from the vessel while keeping a constant temperature. At atmospheric pressure and after a cool down period the aerogel is removed from the vessel.

The foams are higher in density than their theoretical values because of shrinkage during the drying step.

Before the critical drying step the gel may be exchanged into a solvent more suitable for supercritical drying, for example liquid carbondioxide, possibly via an intermediate solvent such as acetone or via liquid carbondioxide containing modifiers.

An advantage of the aerogels and their preparation method according to the present invention is that such an solvent exchange step is not really necessary. The known organic and inorganic aerogels being based on aqueous systems always need at least two solvent exchange steps before they can be supercritically dried.

The so obtained aerogels showed an openly porous structure with cell sizes less than 100 nm.

Potential applications for the present aerogels include, but are not limited to, uses as thermal insulators in e.g. refrigerators and construction, catalyst supports, permselective membranes, gas filters in chemical processing chromatographic packings, sensors, lenses, solar collectors and impedance matching devices. Future applications could include lightweight insulative clothing, fire-retardant architectural materials, high resolution sonic detectors, autofocus cameras, dielectric spacer material for electronics and magnetics, acoustic and thermal absorbers for packaging valuable temperature-sensitive products, components for use in Cerenkov detectors, components for use in high energy physics, or as parts for inertial confinement fusion targets. The present aerogels, when ground, can be used as filler in evacuated insulation panels.

A carbonisation step can be included after the supercritical drying step resulting in a carbon aerogel especially suited for use in capacitors. The present invention is illustrated but not limited by the following examples.

EXAMPLE 1

A known amount of polymeric MDI (Suprasec DNR available from Imperial Chemical Industries) Was weighed into an open cup. Dichloromethane was added subsequently and the mixture was stirred to obtain a homogeneous blend (20 wt % Suprasec DNR). Catalyst Polycat 41 (available from Abbott Laboratories) was added by means of a microliter syringe (weight ratio polyisocyanate/catalyst 200) and after stirring for 10 seconds with a spatula the time was started. The viscosity increase was followed by means of a vibrating needle cure meter. The reaction exotherm was followed by means of an immersed thermocouple in the centre of the solution. The geltime (point at which the viscosity reaches half of its maximum increase) was 73 minutes and the maximum reaction temperature was 29° C.

The obtained gel was supercritically dried. The gel was transferred in vials and pressurised at room temperature using nitrogen gas. After attaining a pressure of 70 bar the temperature of the oven which contained the vessel was increased to a temperature of 250° C. The gel was continuously flushed for two hours with nitrogen keeping pressure and temperature constant. The pressure was slowly released from the vessel until atmospheric conditions were reached while keeping a constant temperature. After the cool down period (15 minutes) the dried aerogel was removed from the vessel.

The obtained gel was transparent and had an orange yellow colour. Density of the obtained gel was 800 kg/m$^3$.

The obtained gel was characterised by means of transmission electron microscopy (TEM) and Brunauer-Emmet-Teller nitrogen adsorption (BET) measurements.

BET measurements on the aerogel revealed a specific area of 15 m²/g.

Figure 1:
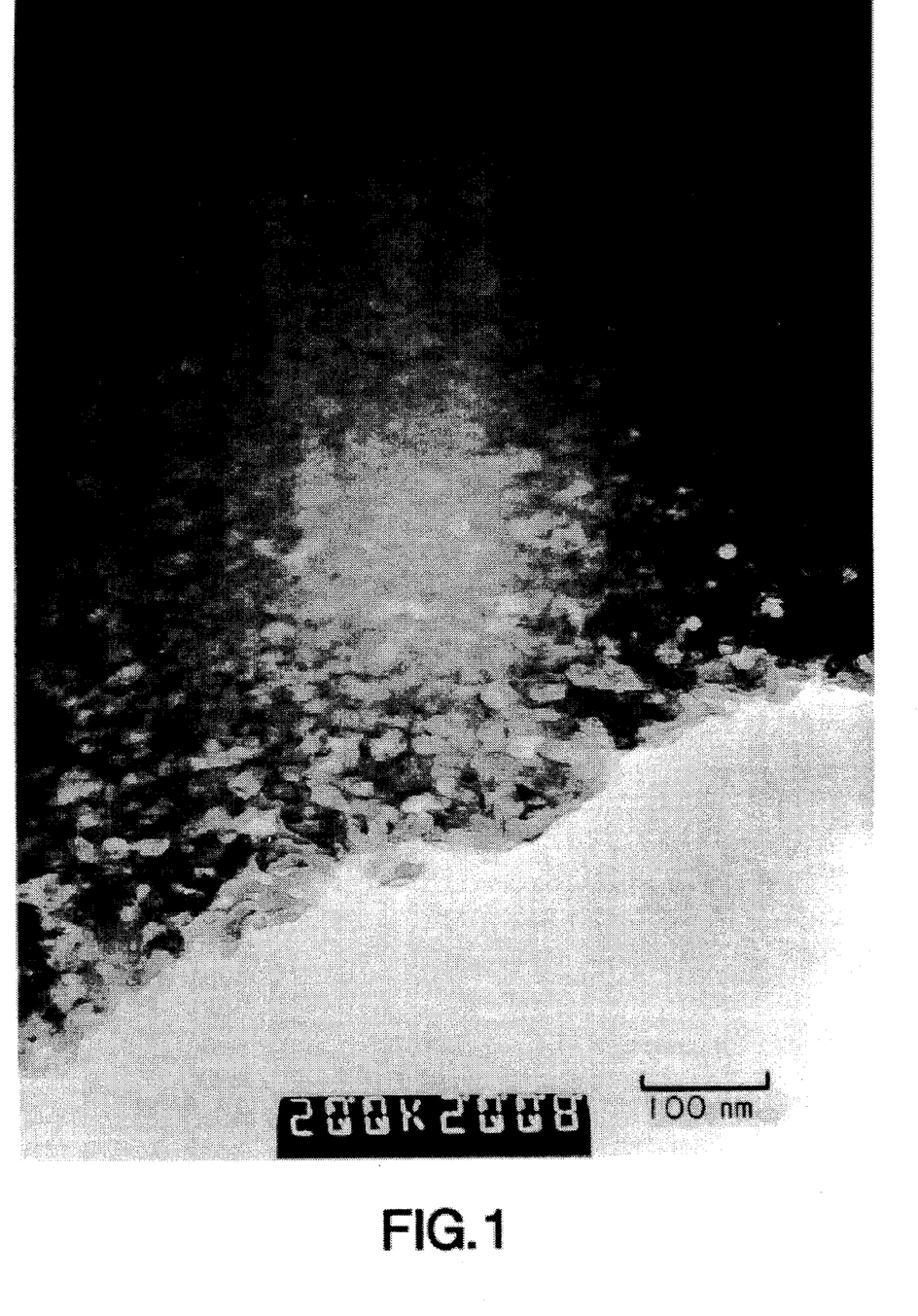
FIGS. 1 and 2 show transmission electron microscopy photographs of the gel obtained in Example 1.
Figure 2:
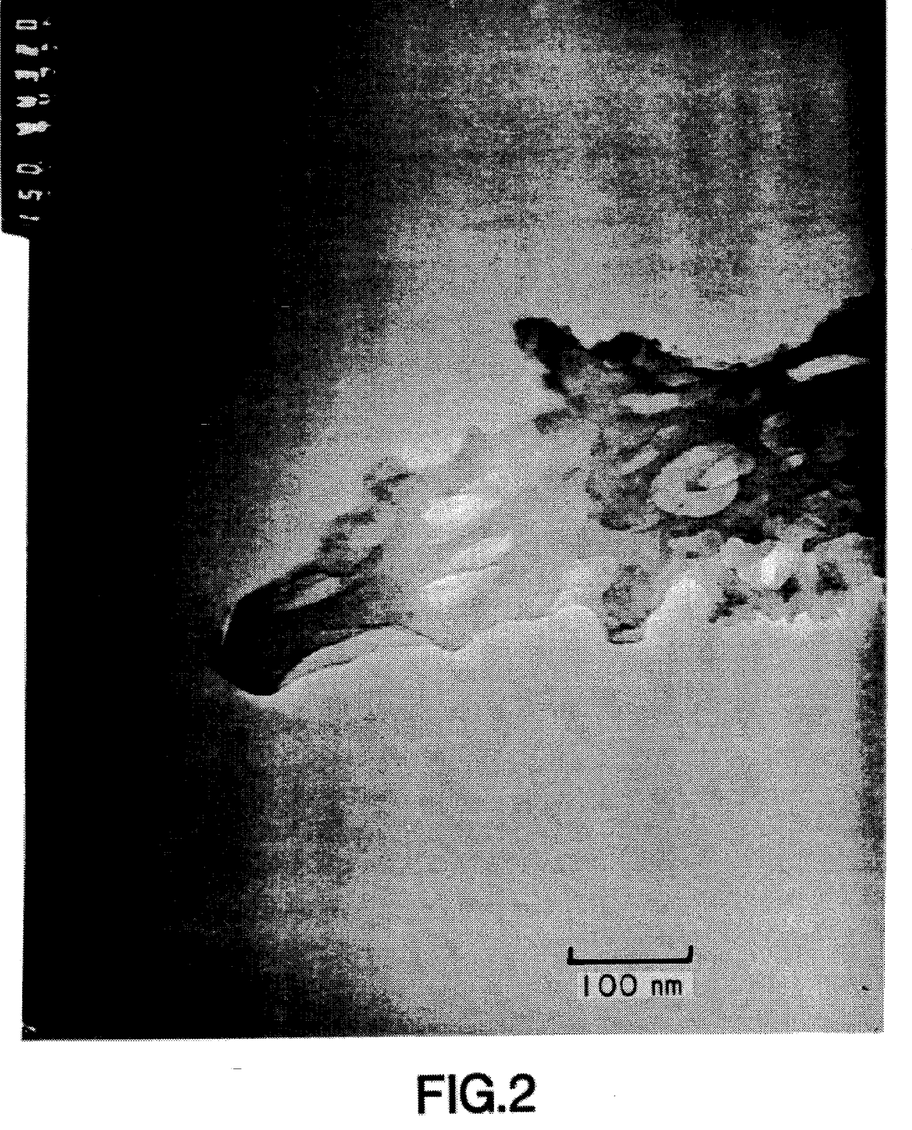

TEM photographs indicated a feature size of 50 nm (see FIGS. 1 and 2).

EXAMPLE 2

A known amount of polymeric MDI (Suprasec DNR available from Imperial Chemical Industries) was weighed into an open cup. Dichloromethane was added subsequently and the mixture was stirred to obtain a homogeneous blend (10 wt % Suprasec DNR). Catalyst Polycat 41 (available from Abbott Laboratories) was added by means of a microliter syringe (weight ratio polyisocyanate/catalyst 400). The reaction proceeded at room temperatures in closed cups. After about 8 hours a gel was formed which was allowed to stand for about 24 hours.

The obtained gel was supercritically dried. The gel was transferred in pressure vials, flushed with liquid $CO_2$ at ambient temperature and at a pressure of 90 to 95 bar for 30 minutes, left in the liquid $CO_2$ at 25 to 28° C. and 95 bar for 30 minutes and again flushed with liquid $CO_2$ at 30° C. and 90 to 95 bar for another 30 minutes. The temperature was increased to 50° C. while keeping the pressure constant at 90 to 95 bar. The gel was then flushed with the supercritical $CO_2$ for 3 hours. The pressure was slowly released from the vessel (over 1 hour) until atmospheric conditions were reached while keeping a constant temperature. After the cool down period the dried aerogel was removed from the vessel.

A white opaque aerogel was obtained having a density of 350 kg/m³. BET measurements on the aerogel revealed a specific area of 210 m²/g and an average pore diameter in desorption mode of 18 nm.

EXAMPLE 3

An aerogel was prepared along the lines described in example 2 but including a solvent exchange to acetone prior to the supercritical drying step. The solvent was exchanged in five times over 5 days and the gel turned from yellow transparent into white opaque.

A white opaque aerogel was obtained having a density of 350 kg/m³. BET measurements on the aerogel revealed a specific area of 380 m²/g and an average pore diameter in desorption mode of 20 nm.

EXAMPLE 4

A known amount of polymeric polyisocyanate (SUPRASEC X2185 available from Imperial Chemical Industries) was put into a reaction vessel. Dichloromethane was added hereto until a blend of 3% by weight of polyisocyanate in dichloromethane was obtained. The catalyst DABCO TMR (available from Air Products) was added so as to achieve a weight ratio of polyisocyanate/catalyst of 50. The vessel was closed and the mixture was stirred with a magnetic stirrer.

The closed vessel was placed in an oven at 45° C. After one hour a solid gel was formed. The vessel was left at 45° C. for 9 days.

After this cure time the dichloromethane was exchanged for acetone via several addition/removal cycles. Once the acetone fraction was free from dichloromethane the sample was flushed with liquid carbondioxide at ambient temperature and pressures of 90 to 95 bar for 30 minutes. The sample was left emersed in liquid carbondioxide for 30 minutes after which the flushing with liquid carbondioxide was continued for another 30 minutes.

The temperature was increased to 50° C. while maintaining a pressure of 90 bar and flushed with supercritical carbondioxide for 3 hours.

After this flushing the pressure was slowly released to atmospheric and the sample was allowed to cool.

A white opaque aerogel was obtained having a density of 140 to 180 kg/m³, a specific surface area of 900 m²/g and an average pore diameter of 7.5 nm.

EXAMPLE 5

Polymeric polyisocyanate (SUPRASEC X2185 available from Imperial Chemical Industries) was weighed into a pressure vessel. DABCO TMR (available from Air Products) was added at a polyisocyanate/catalyst level of 50 and dichloromethane until a blend of 3% by weight of polyisocyanate in dichloromethane was obtained.

The vessel was closed, the mixture stirred and put in an oven at 40°–45° C. in a quiescent state for 7 days followed by a 7 days cure time at room temperature.

The dichloromethane was exchanged under pressure for liquid carbondioxide at a pressure of 90 bar and a temperature of 25° C. After this solvent exchange the temperature was increased to 85° C. while maintaining a constant pressure. The vessel was flushed with supercritical carbondioxide for 30 minutes after which the pressure and temperature were slowly released to ambient conditions.

Figure 3:
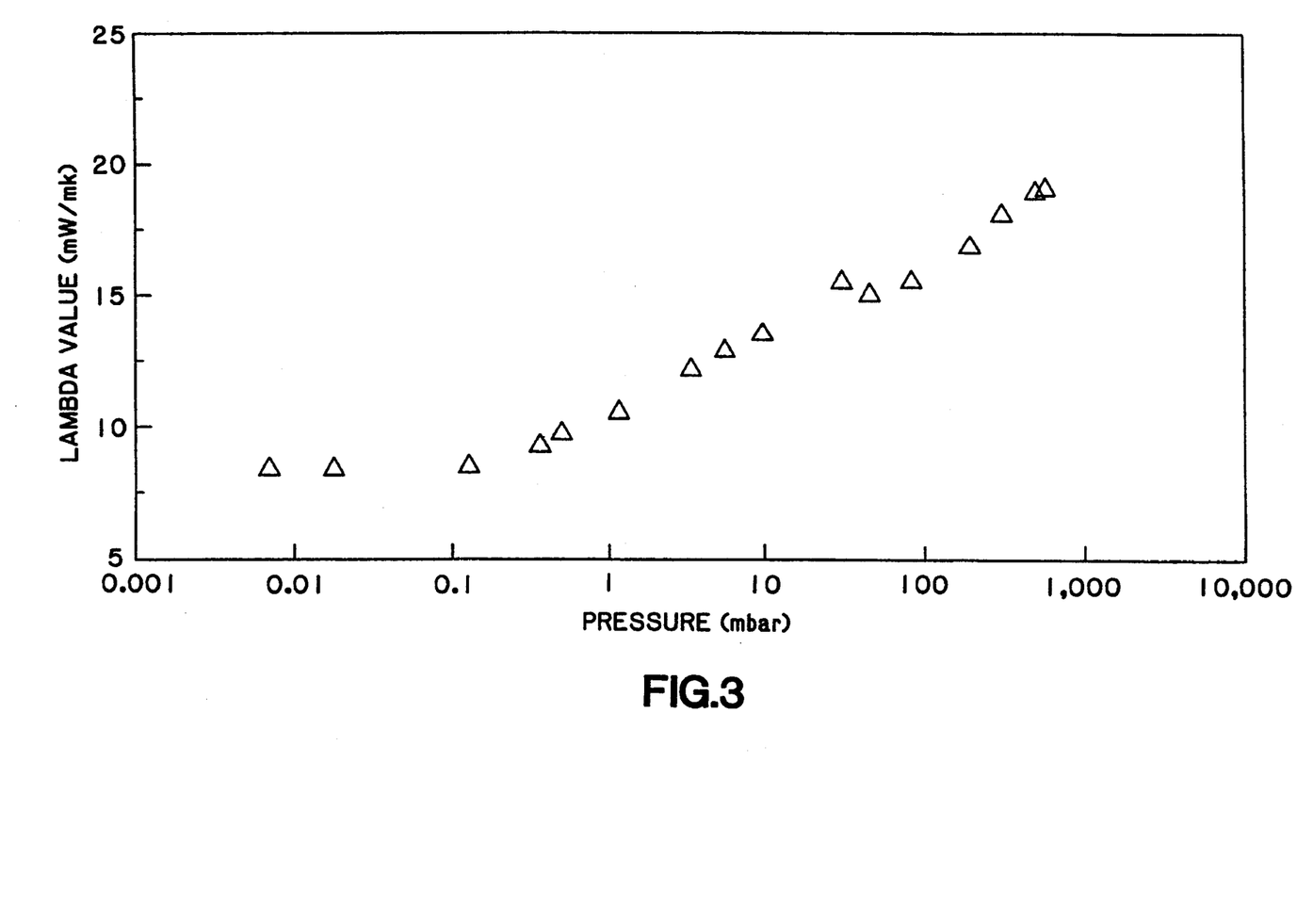
FIG. 3 shows the thermal conductivity (lambda value at 10° C. in mW/m° K.) as a function of pressure (in mbar) for the aerogels obtained in Example 5 ground to a coarse powder of 100 to 200 micron particle size.
Figure 4:
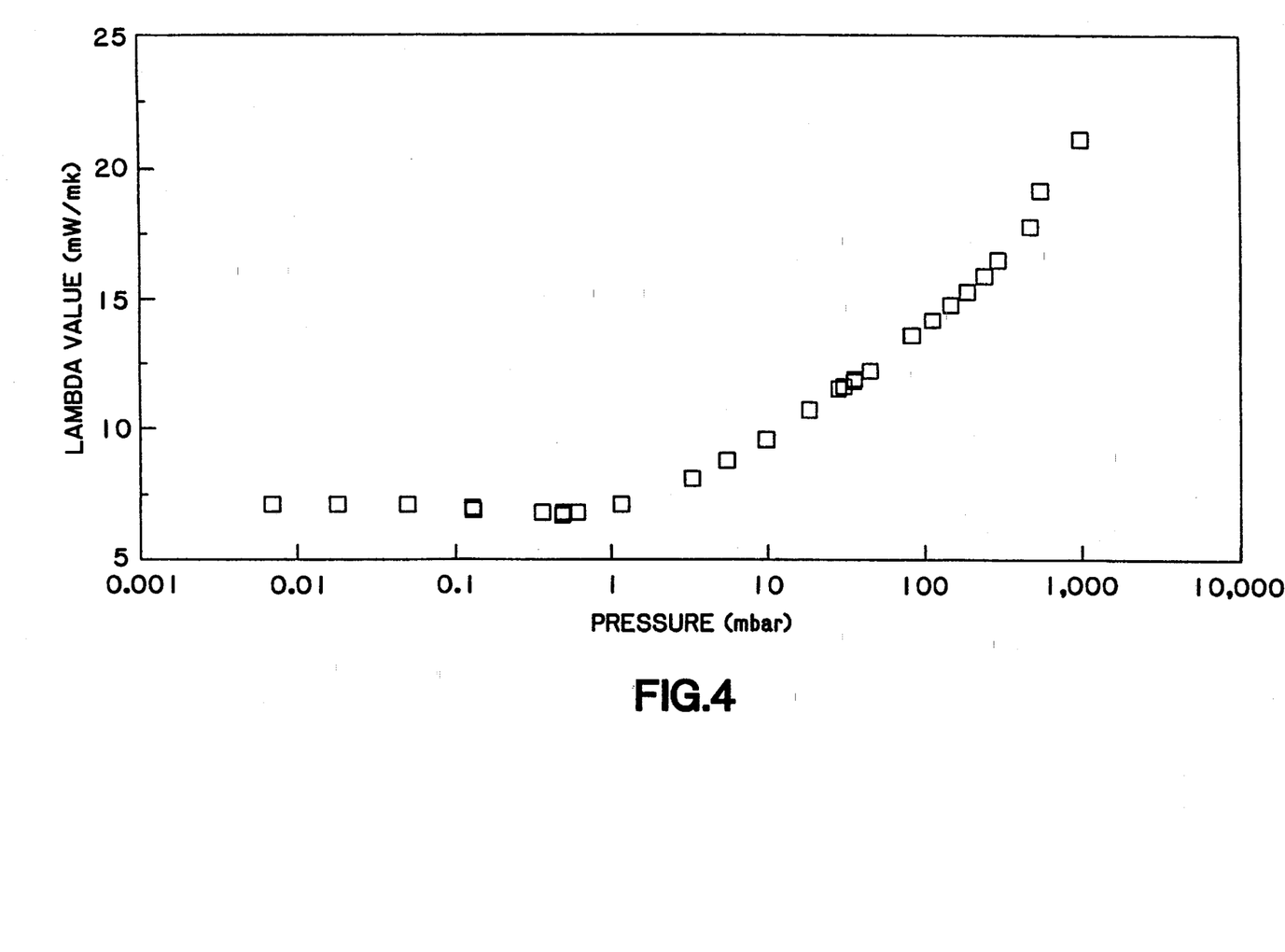
FIG. 4 shows the thermal conductivity (lambda value at 10° C. in mW/m° K.) as a function of pressure (in mbar) for the aerogels obtained in Example 5 ground to a powder of 10 to 20 micron particle size.

The obtained opaque aerogel had a density of 200 kg/m³, a specific surface area of 800–850 m²/g and an average pore diameter of 6–8 nm. FIG. 3 shows the thermal conductivity (lambda value at 10° C. in mW/m.K) as a function of pressure (in mbar) for the obtained aerogels ground to a coarse powder of 100 to 200 micron particle size. The same aerogel ground to a powder of 10 to 20 micron particle size gives a lambda versus pressure performance as shown in FIG. 4.

EXAMPLE 6

A prepolymer was made from SUPRASEC X2185 (available from Imperial Chemical Industries) and an alkoxylated monol derived from methanol having an ethyleneoxide/propyleneoxide content of 15/85, a molecular weight of 600 and a hydroxyl value of 94 mg KOH/g. The NCO value of the obtained prepolymer was 15.8%.

A known amount of this prepolymer was weighed into a pressure vessel equipped with a magnetic stirrer. A mixture of Polycat 41 (available from Air Products) and HCFC 22 (0.75 ml catalyst/50 g HCFC 22) was added to the prepolymer until a 10% solution of prepolymer in HCFC 22 was obtained. The polyisocyanate/catalyst ratio was 20.

The mixture was vigorously stirred for 20 minutes and left in a quiescent state for 5 days at room temperature.

After the cure period CFC 22 was added to the vessel up to a pressure of 40 bar. The temperature was slowly increased to 120° C. while maintaining a maximum pressure of 80 bar. This situation was kept for 30 minutes after which the pressure was released slowly and simultaneously the pressure vessel was flushed with nitrogen at the set pressure. The pressure was slowly released till atmospheric after which the sample was allowed to cool down.

The obtained opaque aerogel had a density of 650 kg/m$^3$ and a surface area of 48 m$^2$/g.

EXAMPLE 7

2 g of oxypropylated ethylene diamine and 8 g of SUPRASEC X2185 (available from Imperial Chemical Industries) were mixed with 90 g of dichloromethane. To this mixture was added 0.1 ml of Catalyst SFC (available from Imperial Chemical Industries).

The reaction mixture was stirred vigorously for 1 minute and then left in a quiescent state at 45° C. After 20 hours 0.005 ml of DABCO TMR (available from Air Products) was added to enhance post cure reaction. A homogeneous translucent gel was formed which was supercritically dried using the procedure described in example 5 above.

The resulting aerogel had a density of 427 kg/m$^3$ and an average pore diameter of 18.5 nm with a specific surface area of 266 m$^2$/g.

EXAMPLE 8

The experiment described in example 7 above was repeated using 1 g of oxypropylated ethylene diamine, 0.075 ml Catalyst SFC and 0.025 ml Polycat 41.

After 8 hours at 45° C. a homogeneous gel was formed which was allowed to cure at room temperature for 2 days.

After supercritical drying a transparent aerogel with a specific surface area of 445 m$^2$/g, a density of 398 kg/m$^3$ and a pore size of 10.9 nm was obtained.

EXAMPLE 9

Example 8 was repeated using only 0.075 ml Catalyst SFC as catalyst. After 4 hours at 45° C. 0.025 ml of DABCO TMR was added additionally.

A homogeneous solid gel was obtained after 1 hour at 45° C.

EXAMPLE 10

0.6 g oxypropylated ethylene diamine, 97 g dichloromethane and 2.4 g of SUPRASEC X2185 (available from Imperial Chemical Industries) were mixed in a pressure vessel. 0.3 ml of Catalyst SFC (available from Imperial Chemical Industries) was added hereto.

The vessel was closed and heated to 45° C. for 2 hours. 0.03 ml of DABCO TMR (available from Air Products) was added to the reaction mixture.

A solid opaque gel was formed after 90 minutes.

EXAMPLE 11

Example 10 was repeated with 0.3 g oxypropylated ethylene diamine and 2.7 g SUPRASEC X2185.

A solid opaque aerogel was formed after 24 hours.

EXAMPLE 12

A 10 wt % solution of SUPRASEC X2185 was made in methyl ethyl ketone. DABCO TMR (available from Air Products) was added at a polyisocyanate/catalyst ratio of 300. A white gel was formed after 24 hours.

This gel was solvent exchanged for liquid carbondioxide at 90 bar and room temperature after which the carbondioxide was supercritically removed.

The resulting aerogel had a density of 90 kg/m$^3$ and a specific surface area of 56 m$^2$/g. The aerogel had a powdery structure with an average interstitial pore size (measured via BET) of 16.7 nm.

EXAMPLE 13

Example 12 was repeated in tetrahydrofuran as solvent using Polycat 41 at a polyisocyanate/catalyst ratio of 100.

The resulting aerogel had a density of 175 kg/m$^3$ and a specific surface area of 448 m$^2$/g.

EXAMPLE 14

Example 13 was repeated in monochlorobenzene as solvent.

The reaction profile was slow and after 48 hours a translucent gel was formed.

The resulting aerogel had a density of 284 kg/m$^3$, a specific surface area of 398 m$^2$/g and a pore size of 10.2 nm.

EXAMPLE 15

4 g of SUPRASEC X2185 is dissolved in 96 g of THF. To this mixture 0.8 g of Polycat 41 is added. The mixture is stirred and left in a quiescent state until a sol-gel is obtained. The sol-gel is solvent exchanged for liquid $CO_2$ and subsequently supercritically dried at a temperature of more than 32° C. and a pressure of more than 73 bar. An opaque aerogel is obtained with a density of 70 kg/m$^3$, a specific surface area of 515 m$^2$/g and an average pore size of 10 nm.

EXAMPLE 16

3 g of XR159 (available from Imperial Chemical Industries) is dissolved in 125 g of $CH_2Cl_2$. To this mixture 3.6 g of SUPRASEC X2185 (available from Imperial Chemical Industries) is added and the mixture is stirred for 5 minutes after which it is left in a quiescent state at room temperature. A translucent sol-gel is formed after a few days.

This gel is transferred to a pressure vessel where the $CH_2Cl_2$ is solvent exchanged for liquid carbon dioxide. After complete solvent exchange the sol-gel is supercritically dried at a temperature of more than 32° C. and a pressure of more than 73 bar, upon which a translucent aerogel is formed. The density of the aerogel is 350 kg/m$^3$, with a specific surface area of 110 m$^2$/g.

EXAMPLE 17

20 g of SUPRASEC X2185 (available from Imperial Chemical Industries) are charged in a pressure vessel. The vessel is closed after nitrogen blanketing and 0.04 ml of Polycat P41 is brought into an injection loop of the reactor. 13.6 g of $CO_2$ are charged under vapour pressure into the reaction vessel emptying the injection loop in the mean time. The mixture is stirred for 30 minutes after which the reactor is left in a quiescent state for 1 day at room temperature.

Following this cure time 70 g of $CO_2$ are charged into the pressure vessel and the temperature is increased above the supercritical temperature of $CO_2$ (32° C.). The pressure inside the vessel is allowed to build up and kept constant for at least 30 minutes. In the next phase the pressure is slowly released from the vessel at a constant temperature. The vessel is cooled down to ambient temperature after atmospheric conditions have been reached inside the pressure vessel.

A solid opaque microporous material with a density of 280 kg/m³ is obtained.

EXAMPLE 18

Example 5 was repeated using SUPRASEC X2471 (1% by weight of Fluorad FC10 available from 3M (Fluorad is a trademark of 3M) and 99% by weight SUPRASEC X2185 available from ICI PLC) instead of SUPRASEC X2185.

An opaque sol-gel was formed which after supercritical drying resulted in an opaque aerogel with a density of 183 kg/m³ a specific surface area of 802 m²/g and an average pore size of 9.6 mm.

EXAMPLE 19

Example 5 was repeated using the reaction product of 1% by weight 1H,1H,7H dodecafluoro 1-heptanol available from 3M and 99% by weight SUPRASEC X2273 available from ICI PLC instead of SUPRASEC X2185.

An opaque sol-gel was formed which after supercritical drying resulted in an opaque aerogel with a density of 174 kg/m³ a specific surface area of 836 m²/g and an average pore size of 9.1 mm.

We claim:

1. Polyisocyanate based organic aerogel having pore sizes of less than or equal to 100 nm, wherein said aerogel is selected from the group consisting of polyurethane aerogels, polyurea aerogels, polyisocyanurate aerogels, polyisocyanurate/polyurethane aerogels, polyallophanate aerogels, polybidentate aerogels and polybiuret aerogels.

2. Aerogel according to claim 1 having pore sizes in the range 5 to 50 nm.

3. Aerogel according to claim 1 having densities in the range 1 to 1000 kg/m³.

4. Aerogel according to claim 3 having densities in the range 20 to 400 kg/m³.

5. Aerogel according to claim 1 having surface areas in the range 10 to 1500 m²/g.

6. Aerogel according to claim 5 having surface areas in the range 200 to 1000 m²/g.

7. Method for preparing an aerogel as defined in claim 1 comprising the steps of
    a) mixing an organic polyisocyanate and an isocyanate trimerisation catalyst in a suitable solvent,
    b) maintaining said mixture in a quiescent state for a sufficiently long period of time to form a polymeric gel, and
    c) supercritically drying the obtained gel.

8. Method according to claim 7 wherein the organic polyisocyanate is diphenylmethane diisocyanate or polymethylene polyphenylene polyisocyanate or an isocyanate-ended prepolymer.

9. Method according to claim 7 wherein the organic polyisocyanate is used in amounts ranging from 0.5 to 30% by weight based on the total reaction mixture.

10. Method according to claim 7 wherein a higher functionality isocyanate-reactive compound and a urethane catalyst are mixed together with the other ingredients in step a).

11. Method according to any one of claim 10 wherein the higher functionality isocyanate-reactive compound is the reaction product of alkylene oxides with initiators containing 2 to 8 active hydrogen atoms per molecule.

12. Method according to claim 11 wherein the initiator is ethylene diamine.

13. Method according to claim 10 wherein the higher functionality isocyanate-reactive compound is used in amounts varying between 1 and 60% by weight based on the polyisocyanate.

14. Method according to claim 7 wherein the isocyanate trimerisation catalyst is a triazine derivative.

15. Method according to claim 10 wherein the urethane catalyst is a tertiary amine and wherein the polyisocyanate/catalyst weight ratio is between 5 and 1000.

16. Method according to claim 7 wherein the solvent is dichloromethane.

17. Method according to claim 7 wherein the solvent is exchanged prior to supercritically drying the gel.

18. Method according to claim 17 wherein the solvent is exchanged into liquid carbondioxide.

* * * * *